(12) United States Patent
Matsui

(10) Patent No.: US 10,608,885 B2
(45) Date of Patent: Mar. 31, 2020

(54) INFORMATION PROCESSING METHOD AND STORAGE MEDIUM

(71) Applicant: CANON KABUSHIKI KAISHA, Tokyo (JP)

(72) Inventor: Yusuke Matsui, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 117 days.

(21) Appl. No.: 15/163,021

(22) Filed: May 24, 2016

(65) Prior Publication Data

US 2016/0350040 A1    Dec. 1, 2016

(30) Foreign Application Priority Data

May 29, 2015    (JP) .................................. 2015-110496

(51) Int. Cl.
*H04L 12/24*    (2006.01)
*H04L 29/12*    (2006.01)
*H04L 12/751*    (2013.01)

(52) U.S. Cl.
CPC .............. *H04L 41/12* (2013.01); *H04L 41/04* (2013.01); *H04L 61/2046* (2013.01); *H04L 45/02* (2013.01); *H04L 61/103* (2013.01); *H04L 61/2015* (2013.01)

(58) Field of Classification Search
None
See application file for complete search history.

(56) References Cited

U.S. PATENT DOCUMENTS

| 7,957,316 B2* | 6/2011 | Hatano | H04L 41/046 370/252 |
| 8,433,789 B2 | 4/2013 | Nagatani | 709/224 |
| 8,724,500 B2* | 5/2014 | Gu | H04L 61/2046 370/252 |
| 2002/0131446 A1* | 9/2002 | Metcalf, III | G05B 19/4186 370/465 |
| 2005/0005109 A1* | 1/2005 | Castaldi | G06F 21/606 713/165 |
| 2005/0052694 A1* | 3/2005 | Asano | G06F 21/31 358/1.15 |
| 2006/0129669 A1* | 6/2006 | Kojima | H04L 41/082 709/223 |
| 2014/0269657 A1* | 9/2014 | Kim | H04W 8/005 370/338 |

FOREIGN PATENT DOCUMENTS

| JP | 2010-239462 A | 10/2010 |
| JP | 5300562 | 9/2013 |

* cited by examiner

*Primary Examiner* — Angel T Brockman
(74) *Attorney, Agent, or Firm* — Venable LLP

(57) ABSTRACT

An information processing method includes the steps of detecting a device by searching one or more devices in a network, and communicating with the device which has been detected in the detecting step, by a communication method varying depending on whether or not searching for another device is in progress in the detecting step. In a case where the searching is in progress, communication is performed with the detected device by broadcast communication or multicast communication including an identifier allocated uniquely to the detected device, and in a case where the searching is not in progress, communication is performed with the detected device by unicast communication using an IP address which is allocated to the detected device and is acquired by the detecting of the detected device.

27 Claims, 6 Drawing Sheets

FIG.6A

NETWORK PRINTER MANAGEMENT SCREEN — 501

| PRODUCT NAME | STATUS | IP ADDRESS | MAC ADDRESS |
|---|---|---|---|
| ○○○○ABC-123 | UNICAST COMMUNICATION POSSIBLE | 192.168.0.1 | 12:34:54:78:90:AB |
| ○○○○DEF-123 | DUPLICATE IP ADDRESS | 192.168.0.4 | 12:34:54:78:90:CD |
| ○○○○ABC-123 | DUPLICATE IP ADDRESS | 192.168.0.4 | 12:34:54:78:90:EF |
| ○○○○HIJ-456 | UNICAST COMMUNICATION IMPOSSIBLE | 10.0.1.5 | 12:34:54:78:90:GH |

502

SEARCH START — 504
NETWORK SETTING — 503

FIG.6B

NETWORK SETTING SCREEN — 505

SET IP ADDRESS
IP ADDRESS — 507
SUBNET MASK — 508
DEFAULT GATEWAY — 509

SET — 506

INFORMATION PROCESSING METHOD AND STORAGE MEDIUM

BACKGROUND OF THE INVENTION

Field of the Invention

The present invention relates to an information processing method and a storage medium, and in particular, to a technique to determine a communication method with a device connected to a network.

Description of the Related Art

In an office environment, a plurality of devices is connected to a network and many users use those devices. Devices include, for example, network equipment, such as a network printer. In such an environment, a setting and management of those devices are performed by an application intended for a manager (hereinafter, referred to as a management application) installed on a dedicated computer.

As a method of performing, by a management application, processing to acquire information and to change a setting for a specific device, there is a method that uses unicast communication. The unicast communication is a method of performing communication by specifying an IP address of a specific device. However, in the case where an invalid setting (e.g., a setting of a duplicate of an IP address) is set to a specific device, there is a possibility that a command for the specific device is transmitted to another device. As described above, with the method that uses unicast communication, it is not possible for a management application to perform bidirectional communication with a specific device, and therefore, there is a possibility that it is not possible to perform processing for the device.

In the case where a setting and management of a device are performed, there is a method that uses broadcast communication or multicast communication, besides unicast communication. Japanese Patent No. 5300562 has described the method of, in the case where a printer connected to a network is searched for again at the time of printing or at the time of acquisition of status, searching again by broadcast communication or unicast communication based on information indicating whether the printer can perform broadcast communication or can perform unicast communication.

However, the method that uses broadcast communication or multicast communication has such a problem that the amount of communication traffic becomes large. Depending on the scale of an office environment, there is a case where one hundred or more devices exist, and in the case where a setting and management of the devices are performed by using broadcast communication or multicast communication in such an environment, there is a possibility that an increase in communication traffic will result.

Consequently, in the case where a manager manages a device in an office environment, it is desired to suppress communication traffic by appropriately selecting a communication method with the device, not only to be capable of securely performing bidirectional communication with the device.

SUMMARY OF THE INVENTION

An information processing method according to the present invention includes the steps of detecting a device by searching a network and communicating with the device detected in the detecting, and in the communicating, in the case where a predetermined condition is satisfied, communication is performed with the detected device by broadcast communication or multicast communication including an identifier allocated uniquely to the detected device, and in the case where the predetermined condition is not satisfied, communication is performed with the detected device by unicast communication, and the predetermined condition is that an IP address allocated to the detected device is a duplicate of an IP address allocated to another device, or a possibility of the duplicate.

Further features of the present invention will become apparent from the following description of exemplary embodiments (with reference to the attached drawings).

BRIEF DESCRIPTION OF THE DRAWINGS

FIGS. 6A and 6B are explanatory diagrams each showing an example of a UI screen of a management application in the first embodiment.

DESCRIPTION OF THE EMBODIMENTS

Hereinafter, with reference to the attached drawings, embodiments for embodying the present invention are explained. The configurations shown in the following embodiments are merely exemplary and the present invention is not limited to the configurations shown schematically.

[First Embodiment]

Figure 1:
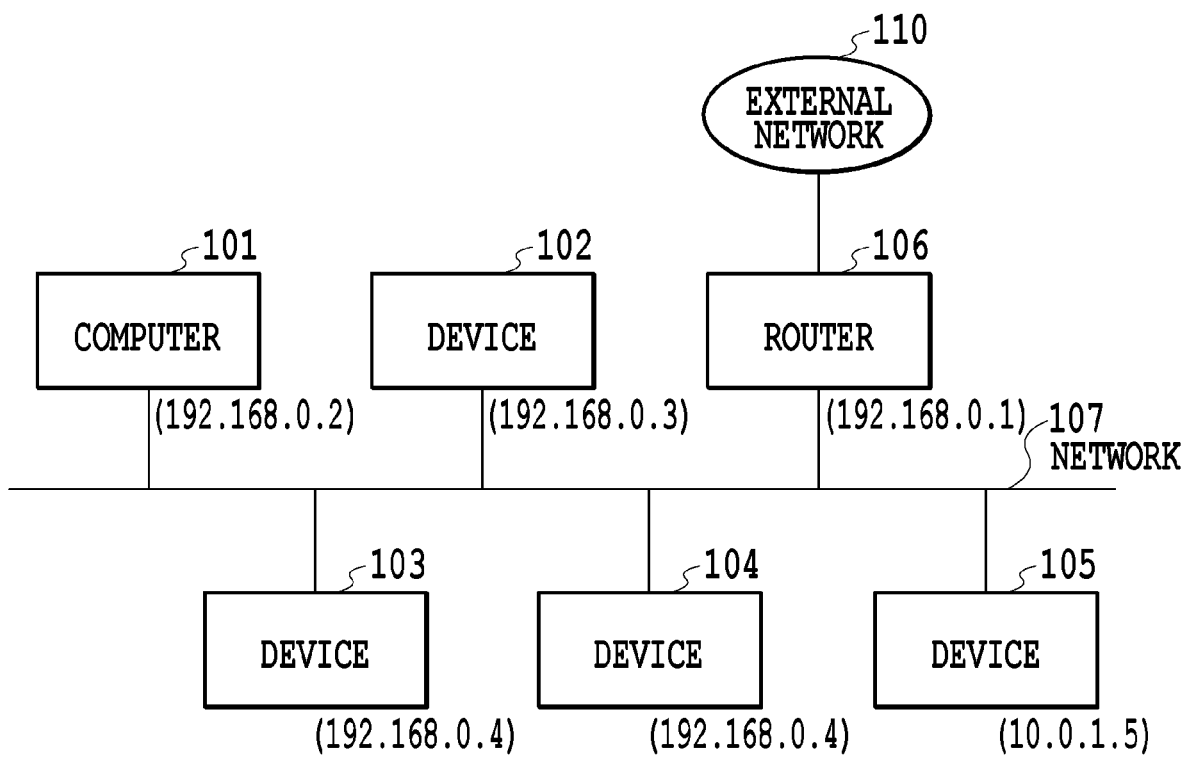
FIG. 1 is a block diagram showing an example of a configuration of a network system including an information processing apparatus according to a first embodiment.

FIG. 1 is a block diagram showing an example of a configuration of a network system including an information processing apparatus (computer 101) according to a first embodiment.

In the network system shown in FIG. 1, the computer 101, devices 102 to 105, and a router 106 are connected via a network 107. Each of the devices and the apparatuses performs communication in accordance with the TCP/IP (Transmission Control Protocol/Internet Protocol) protocol. The network 107 is connected with an external network 110 via the router 106.

The computer 101 is, for example, a personal computer (PC). The devices 102 to 105 are peripherals such as a printer, a copy machine, a facsimile machine, and a scanner, or a multi function peripheral (MFP) including the functions thereof. The router 106 has a DHCP (Dynamic Host Configuration Protocol) server function and allocates an IP address to the computer and the devices 102 to 105. In FIG. 1, the numeric value shown within parentheses located below and to the right of each of the devices and the apparatuses is an IP address that is allocated to each of the devices and the apparatuses in the present embodiment.

Figure 2:
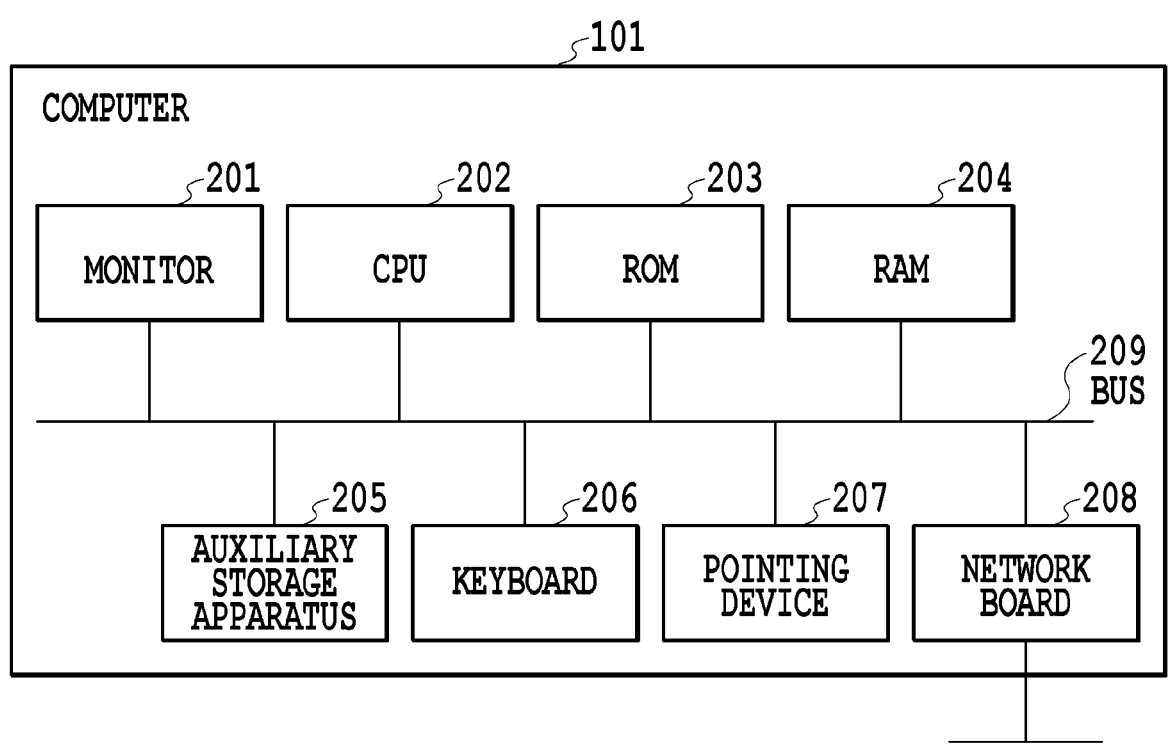
FIG. 2 is a block diagram showing a hardware configuration of the information processing apparatus according to the first embodiment.

FIG. 2 is a block diagram showing a hardware configuration of the information processing apparatus (the computer 101) according to the first embodiment.

The computer 101 includes a monitor 201, a CPU 202, a ROM 203, a RAM 204, an auxiliary storage apparatus 205, a keyboard 206, a pointing device 207, and a network board 208. Each component is connected to one another via a bus 209.

The monitor 201 displays a UI of an application, such as a management application, and a driver.

The CPU 202 loads a program, such as an application and a driver, stored in the ROM 203 or the auxiliary storage apparatus 205 into the RAM 204 and executes the loaded program.

The ROM 203 stores the basic software, such as a BIOS, and various programs for implementing processing that is performed by the computer 101.

The RAM 204 temporarily stores software, such as an application and a driver, and data that is used by the software.

The auxiliary storage apparatus 205 is, for example, a hard disk. The auxiliary storage apparatus 205 stores software (program), such as an operating system (OS), an application, a driver, and various modules.

The driver stored in the auxiliary storage apparatus 205 includes device drivers (scanner driver, printer driver, facsimile driver, etc.) that control the devices 102 to 105. Further, the driver stored in the auxiliary storage apparatus 205 includes a display control driver that controls the display on the monitor 201, a keyboard driver that controls the keyboard 206, and a pointing device driver that controls the pointing device 207. Furthermore, the driver stored in the auxiliary storage apparatus 205 includes a network driver that controls communication of the network board 208.

The application stored in the auxiliary storage apparatus 205 includes a management application. The management application has a device search function by the TCP/IP protocol (SNMP (Simple Network Management Protocol) or the like), and a function to set information to a device by the TCP/IP protocol. It may also be possible for the management application to call a module having the search function and the information setting function and to cause the module to perform those functions. Further, it may also be possible to provide the search function and the information setting function in different modules, respectively.

The keyboard 206 and the pointing device 207 are input apparatuses with which to input instructions from a user.

The network board 208 performs communication with a device via the network.

Here, the hardware configuration of the devices 102 to 105 is explained. The devices 102 to 105 have the same hardware configuration, and therefore, in the following, the device 102 is explained.

Figure 3:
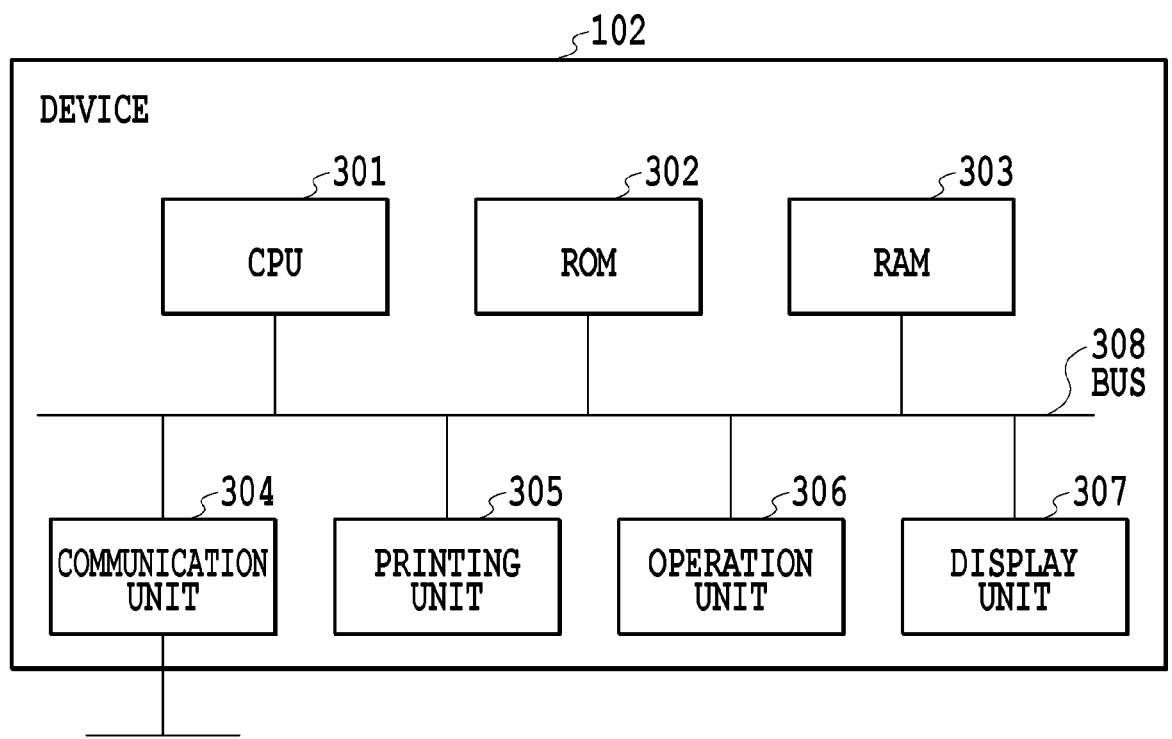
FIG. 3 is a block diagram showing an example of a hardware configuration of a device.

FIG. 3 is a block diagram showing an example of the hardware configuration of the device 102. The hardware configuration shown in FIG. 3 is an example of the hardware configuration in the case where the device 102 is a printer.

As shown in FIG. 3, the device 102 includes a CPU 301, a ROM 302, a RAM 303, a communication unit 304, a printing unit 305, an operation unit 306, and a display unit 307. Each component constituting the device 102 is connected to one another via a bus 308.

The CPU 301 is, for example, a microprocessor. The CPU 301 functions as a central processing unit of the device 102. The CPU 301 loads programs stored in the ROM 302 into the RAM 303 and controls the communication unit 304, the printing unit 305, the operation unit 306, and the display unit 307 by executing the loaded programs.

The ROM 302 stores various programs for implementing processing that is performed by the device 102.

The RAM 303 is used as a work area of the CPU 301. The RAM 303 temporarily stores various kinds of data.

The communication unit 304 performs communication with another device via the network.

The printing unit 305 prints, for example, image data on a printing medium, such as paper.

The operation unit 306 includes an input apparatus, such as a button and a touch panel.

The display unit 307 displays a UI screen for operating the device 102 and various kinds of information on the device 102.

In the case where the device 102 is a device other than a printer, the device 102 includes another component in place of the printing unit 305 or in addition to the printing unit 305. For example, in the case where the device 102 is a scanner, the device 102 includes a read unit configured to read an image on a document as another component.

In the present embodiment, as shown in FIG. 1, the IP address of the router 106 is assumed to be 192.168.0.1. Further, the range of the IP address that can be allocated to the devices 102 to 105 on the network 107 is assumed to be 192.168.0.2 to 192.168.0.255. To the computer 101, the IP address 192.168.0.2 is allocated. To the device 102, the IP address 192.168.0.3 is allocated. To the device 103 and the device 104, the same IP address 192.168.0.4 is allocated. Further, to the device 105, the IP address 10.0.1.5 that is not included in the above-described range of the IP address is allocated.

Figure 4:
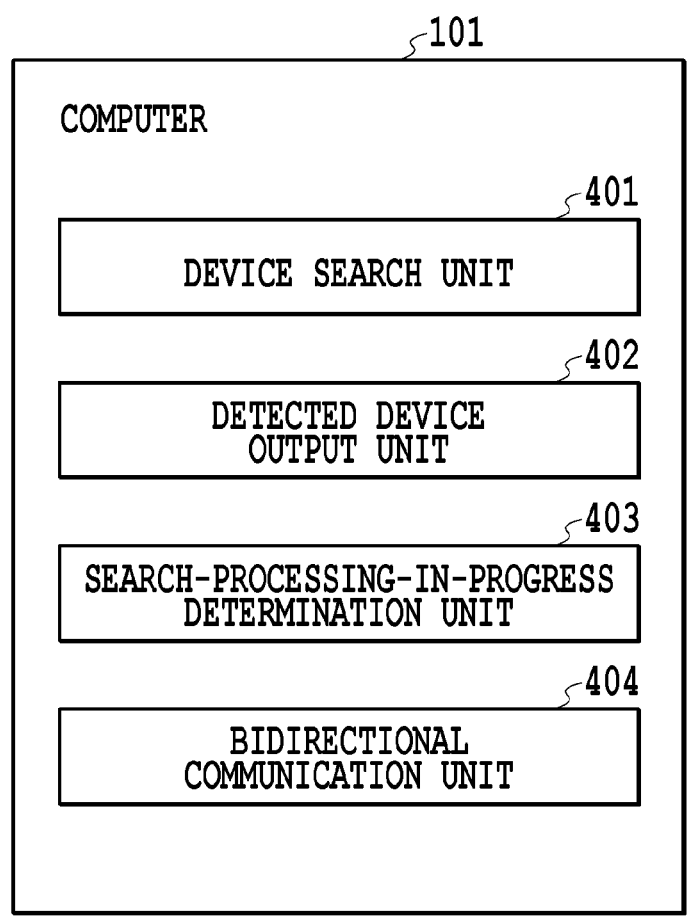
FIG. 4 is a block diagram showing a software configuration of the information processing apparatus according to the first embodiment.

FIG. 4 is a block diagram showing the software configuration of the image processing apparatus (the computer 101) according to the first embodiment. As shown in FIG. 4, the computer 101 includes a device search unit 401, a detected device output unit 402, a search-processing-in-progress determination unit 403, and a bidirectional communication unit 404. Each unit shown in FIG. 4 is implemented by the CPU 202 of the computer 101 executing the management application stored in the auxiliary storage apparatus 205 after reading the management application. In the present embodiment, the management application searches the network and displays a list of detected devices on the monitor 201. Further, the management application performs processing, such as information acquisition processing and setting change processing, for a device selected by a user from the list of detected devices.

The device search unit 401 searches for a device on the network 107 that is connected to the computer 101. In the present embodiment, the device search unit 401 detects the devices 102 to 105.

The detected device output unit 402 displays a list of devices detected by the device search unit 401 on the monitor 201.

A user selects a specific device from the list of devices displayed on the monitor 201.

The search-processing-in-progress determination unit 403 determines whether the device search is still in progress or the device search has been completed, i.e., whether the search processing in the device search unit 401 is still in progress or has been completed.

The bidirectional communication unit 404 determines a communication method at the time of performing bidirectional communication with a device selected by a user. In the present embodiment, the bidirectional communication unit 404 determines a communication method at the time of performing bidirectional communication with a device selected by a user based on the determination results of the search-processing-in-progress determination unit 403. Specifically, in the case where the search-processing-in-progress determination unit 403 determines that the search processing is in progress, the bidirectional communication unit 404 determines the communication method with a device selected by a user to be broadcast communication or multicast communication including an identifier (e.g., MAC address) allocated uniquely to the device in a packet. Further, in the case where the search-processing-in-progress determination unit 403 determines that the search processing has been completed, the bidirectional communication unit 404 determines whether a device selected by a user can perform unicast communication. The bidirectional communication unit 404 performs unicast communication on trial to a device selected by a user and in the case where there is a response from the device, the bidirectional communication unit 404 determines the communication method with the device to be unicast communication. On the contrary, in the case where there is no response from a device selected by a user, the bidirectional communication unit 404 determines the communication method with a device selected by a user to be broadcast communication or multicast communication including an identifier (e.g., MAC address) allocated uniquely to the device in a packet. Then, the bidirectional communication unit 404 transmits a communication command for performing information acquisition processing or setting change processing for a device selected by a user by the determined communication method.

Here, the operation of the present embodiment is explained.

Figure 5:
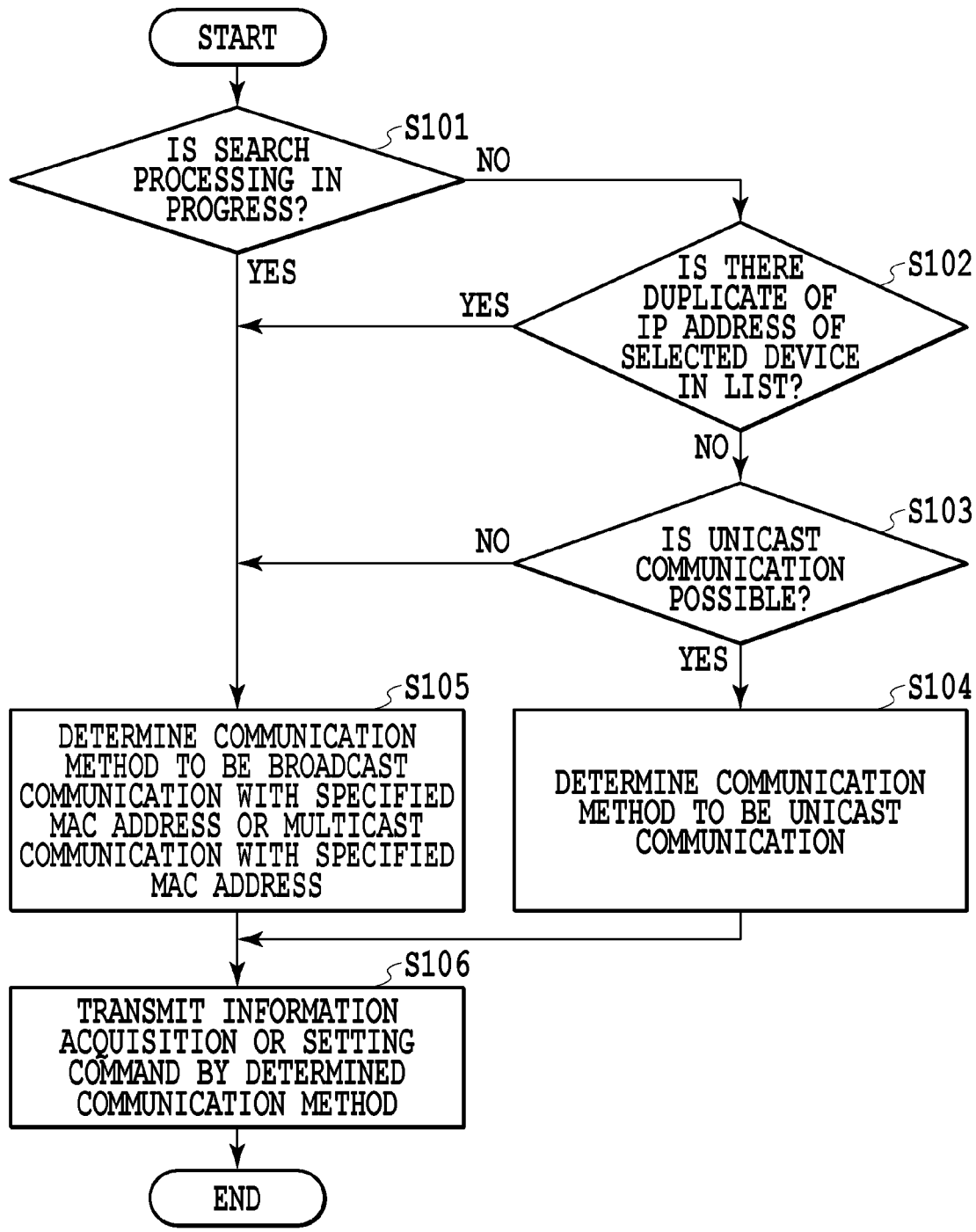
FIG. 5 is a flowchart showing processing of the information processing apparatus according to the first embodiment.

FIG. 5 is a flowchart showing processing of the information processing apparatus (the computer 101) of the first embodiment. FIGS. 6A and 6B are each an explanatory diagram showing an example of a UI screen of the management application in the first embodiment.

The processing shown in FIG. 5 is implemented by the computer 101 executing the management application stored in the auxiliary storage apparatus 205 after loading the management application into the RAM 204.

First, in the case where the management application is activated by the CPU 202, on the monitor 201, a main screen 501 of the management application shown in FIG. 6A is displayed. In the case where a Search start button 504 on the main screen 501 is pressed down by a user operation, the device search unit 401 starts to search for a device on the network 107. In the case where the device search unit 401 has detected a device, the detected device output unit 402 outputs information on the detected device to the monitor 201. Due to this, devices that have been searched for are added sequentially to a list (search list 502). A user selects a specific device from the search list 502. In the case where a user presses down a Network setting button 503 in this state, a Network setting screen 505 shown in FIG. 6B is displayed. A user inputs information to be set to the selected device in input areas 507 to 509 on the Network setting screen 505 and presses down a Set button 506.

In the case where the Set button 506 is pressed down, instructions to perform a setting for the device are sent to the search-processing-in-progress determination unit 403 of the computer 101, and the processing shown in FIG. 5 is started.

First, upon receipt of the instructions to perform a setting for the device, the search-processing-in-progress determination unit 403 checks whether the device search unit 401 is currently performing the search processing (step S101). At this time, in the case where the device search unit 401 is currently performing the search processing (YES at step S101), the bidirectional communication unit 404 determines the communication method at the time of performing bidirectional communication with a device that a user has selected from the search list 502 to be broadcast communication or multicast communication including an identifier (MAC address or the like) allocated uniquely to the device in a packet (step S105). In the case where the device search unit 401 has completed the search processing (NO at step S101), the search-processing-in-progress determination unit 403 checks whether there exists an IP address that is a duplicate of the IP address selected by the user in the search list 502 (step S102). At this time, in the case where a duplicate of the IP address exists in the search list 502 (YES at step S102), the bidirectional communication unit 404 determines the communication method with the device selected by the user to be broadcast communication or multicast communication including an identifier allocated uniquely to the device in a packet (step S105). On the other hand, in the case where a duplicate of the IP address does not exist in the search list 502 (NO at step S102), the bidirectional communication unit 404 determines whether or not the device selected by the user can perform unicast communication (step S103). In the case where the device selected by the user can perform unicast communication (YES at step S103), the bidirectional communication unit 404 determines the bidirectional communication with the device selected by the user to be unicast communication (step S104). In the case where the device selected by the user cannot perform unicast communication (NO at step S103), the bidirectional communication unit 404 determines the communication method with the device selected by the user to be broadcast communication or multicast communication including an identifier allocated uniquely to the device in a packet (step S105). The bidirectional communication unit 404 transmits an information acquisition command or a setting command to the device by the determined communication method (step S106).

Here, an example of the operation in the case where the computer 101 performs the above-described processing flow for the network system shown in FIG. 1 is explained.

For example, in the case where a user performs the setting operation for one of the devices in the search list 502 during the search processing of the device search unit 401, the search-processing-in-progress determination unit 403 determines that the device search unit 401 is currently performing the search processing in the processing at step S101. Consequently, in this case, the processing at step S105 is performed and the communication method with the device is determined to be broadcast communication or multicast communication including an identifier (MAC address or the like) with which the specific device can be identified in a packet. As described above, according to the present embodiment, even in the case where all the devices on the network have not been detected yet, i.e., even in the case where there is a possibility of a duplicate of an IP address, it is possible to transmit a command without fail to the device selected by the user. Consequently, it is possible for a manager to acquire information on the device and to change the setting of the device without the need to wait until the management application detects all the devices on the network.

Further, for example, in the case where the user performs the setting operation for the device 102 in the search list 502 after the search processing of the device search unit 401 has been completed, the search processing has already been completed (NO at step S101), and therefore, the processing at step S102 is performed. In the processing at step S102, the search-processing-in-progress determination unit 403 checks whether there exists a duplicate of the IP address 192.168.0.3 of the device 102 in the search list 502. At this time, no duplicate of the IP address exists, and therefore, the bidirectional communication unit 404 determines whether or not the device 102 can perform unicast communication in the processing at step S103. At this time, the bidirectional communication unit 404 determines that the device 102 can perform unicast communication because the IP address 192.168.0.3 of the device 102 is included in the range of IP address (192.168.0.2 to 192.168.0.255) that the router 106 allocates to the devices on the network 107. Then, the bidirectional communication unit 404 performs unicast communication on trial for the device 102 and in the case where there is a response from the device 102, the bidirectional communication unit 404 determines the communication method with the device 102 to be unicast communication in the processing at step S104. On the other hand, in the case where the user performs the setting operation for the device 105 in the search list 502 after the search processing of the device search unit 401 has been completed, the bidirectional communication unit 404 determines that the device 105 cannot perform unicast communication in the processing at step S103 because the IP address 10.0.1.5 of the device 105 is not included in the above-described range of IP address. As a result of this, the processing at step S105 is performed and the communication method with the device 105 is determined to be broadcast communication or multicast communication including an identifier (MAC address or the like) with which the specific device can be identified in a packet. As described above, in the case where no duplicate of the IP address of the device selected by the user exists, unicast communication is performed preferentially, and therefore, it is possible to suppress the occurrence of unnecessary communication traffic.

Further, for example, in the case where the user performs the setting operation for the device 103 in the search list 502 after the search processing of the device search unit 401 has been completed, the search processing has already been completed (NO at step S101), and therefore, the processing at step S102 is performed. In the processing at step S102, the search-processing-in-progress determination unit 403 checks whether there exists a duplicate of the IP address (192.168.0.4) of the device 103 in the search list 502. At this time, a duplicate of the IP address (the IP address of the device 104) exists, and therefore, the processing at step S105 is performed. Then, the communication method with the device 103 is determined to be broadcast communication or multicast communication including an identifier (MAC address or the like) allocated uniquely to the device in a packet. Due to this, even in the case where a duplicate of the IP address of the device selected by the user exists, it is possible to transmit a command without fail to the specific device.

In the present embodiment, the case is taken as an example where device information is acquired or set by the user operation, but it may also be possible to cause the computer 101 to automatically acquire or set device information.

Further, in the present embodiment, the search-processing-in-progress determination unit 403 checks whether there is a duplicate of an IP address, but it may also be possible to cause the device search unit 401 or the detected device output unit 402 to check whether there is a duplicate of an IP address.

In the present embodiment, the case is taken to be an example where the IP address is an IPv4 address, but the IP address may be an IPv6 address.

The device information that the computer 101 can acquire or set may be information other than the IP address. For example, it may also be possible for the computer 101 to acquire or set information that a user can set arbitrarily, such as a device name and a password.

It may also be possible for the bidirectional communication unit 404 to determine whether unicast communication is possible by a method other than the method of performing unicast communication on trial for a specific device. For example, there is a method of determining whether the IP address allocated to a device is included in the range of IP address that the router allocates.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to securely perform bidirectional communication with a specific device at the time of management of the specific device and to reduce communication traffic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110496, filed May 29, 2015, which is hereby incorporated by reference wherein in its entirety.

What is claimed is:

1. An information processing method comprising the steps of:
   detecting a device by searching one or more devices in a network;
   displaying a list indicating one or a plurality of devices detected in the detecting step on a display unit, wherein each of a plurality of devices detected in the detecting step is sequentially added to the list;
   determining whether or not a device is selected by a user from one or a plurality of devices indicated in the list when searching for another device is in progress; and
   communicating with the selected device which has been detected in the detecting step and selected by an instruction, by a communication method varying depending on whether or not it is determined in the determining step that the device is selected by the user when the searching is in progress, wherein in the communicating step:
   in a case where it is determined in the determining step that the device is selected by the user when the searching is in progress, communication is performed with the selected device by an identifier allocated uniquely to the selected device; and
   in a case where it is determined in the determining step that the device is not selected by the user when the searching is in progress, communication is performed with the selected device by an IP address which is allocated to the selected device and is acquired by the detecting of the selected device.

2. The information processing method according to claim 1, wherein
in a case where a first IP address allocated to the selected device and a second IP address allocated to another device are acquired by detecting of the selected device and the another device, and the first IP address is a duplicate of the second IP address, the communication is performed with the selected device by the identifier.

3. The information processing method according to claim 1, wherein
in the communicating step, on a condition that the searching in the detecting step has been completed and it is determined that it is possible to communicate with the selected device by communication by the IP address, communication is performed with the selected device.

4. The information processing method according to claim 3, wherein
in the communicating step, the communication by the IP address with the selected device is performed on trial and in a case where there is a response from the selected device and the searching in the detecting step has been completed, communication is performed with the selected device by the communication by the IP address.

5. The information processing method according to claim 1, wherein
in the communicating step, information on the selected device is acquired.

6. The information processing method according to claim 1, wherein
in the communicating step, communication for performing a setting for the selected device is performed.

7. The information processing method according to claim 1, comprising the step of deciding a communication method with the selected device in the communicating step, based on whether or not the device is selected by the user when the searching is in progress, wherein
in the deciding step:
   in a case where it is determined in the determining step that the device is selected by the user when the searching is in progress, the communication by the identifier is decided to be the communication method; and
   in a case where it is determined in the determining step that the device is not selected by the user when the searching is in progress, communication by the IP address is decided to be the communication method.

8. The information processing method according to claim 1, wherein
the device is a printer that prints an image on a printing medium.

9. The information processing method according to claim 1, wherein the communication by the identifier includes the identifier in a packet.

10. The information processing method according to claim 1, wherein the instruction is an instruction to acquire information or an instruction to perform a setting.

11. A non-transitory computer readable storage medium storing a program for causing a computer to perform an information processing method, the method comprising the steps of:
detecting a device by searching one or more devices in a network;
displaying a list indicating one or a plurality of devices detected in the detecting step on a display unit, wherein each of a plurality of devices detected in the detecting step is sequentially added to the list;
determining, whether or not a device is selected by a user from one or a plurality of devices indicated in the list when searching for another device is in progress; and
communicating with the selected device which has been detected in the detecting step and selected by an instruction, by a communication method varying depending on whether or not it is determined in the determining step that the device is selected by the user when the searching is in progress, wherein
in the communicating step:
   in a case where it is determined in the determining step that the device is selected by the user when the searching is in progress, communication is performed with the selected device by an identifier allocated uniquely to the selected device; and
   in a case where it is determined in the determining step that the device is not selected by the user when the searching is in progress, communication is performed with the selected device by an IP address which is allocated to the selected device and is acquired by the detecting of the selected device.

12. The non-transitory computer readable storage medium according to claim 11, wherein
in a case where a first IP address allocated to the selected device and a second IP address allocated to another device are acquired by detecting of the selected device and the another device, and the first IP address is a duplicate of the second IP address, the communication is performed with the selected device by the identifier.

13. The non-transitory computer readable storage medium according to claim 11, wherein
in the communicating step, on a condition that the searching in the detecting step has been completed and it is determined that it is possible to communicate with the selected device by communication by the IP address, communication is performed with the selected device.

14. The non-transitory computer readable storage medium according to claim 13, wherein
in the communicating step, the communication by the IP address with the selected device is performed on trial and in a case where there is a response from the selected device and the searching in the detecting step has been completed, communication is performed with the selected device by the communication by the IP address.

15. The non-transitory computer readable storage medium according to claim 11, wherein
in the communicating step, information on the selected device is acquired.

16. The non-transitory computer readable storage medium according to claim 11, wherein in the communicating step, communication for performing a setting for the selected device is performed.

17. The non-transitory computer readable storage medium according to claim 11, comprising the step of deciding a communication method with the selected device in the communicating step, based on whether or not the device is selected by the user when the searching is in progress, wherein
in the deciding step:
in a case where it is determined in the determining step that the device is selected by the user when the searching is in progress, communication by the identifier is decided to be the communication method; and
in a case where it is determined in the determining step that the device is not selected by the user when the searching is in progress, communication by the IP address is decided to be the communication method.

18. The non-transitory computer readable storage medium according to claim 11, wherein
the device is a printer that prints an image on a printing medium.

19. The non-transitory computer readable storage medium according to claim 11, wherein the communication by the identifier includes the identifier in a packet.

20. The non-transitory computer readable storage medium according to claim 11, wherein the instruction is an instruction to acquire information from the device designated by the user in the list or an instruction to perform a setting to the device designated by the user in the list.

21. An information processing apparatus, comprising:
a memory containing instructions; and
at least one processor for executing the instructions to:
detect a device by searching one or more devices in a network;
display a list indicating one or a plurality of devices detected in the detecting step on a display unit, wherein each of a plurality of devices detected in the detecting step is sequentially added to the list,
determine whether or not a device is selected by a user from one or a plurality of devices being indicated in the list when searching for another device is in progress; and
communicate with the selected device which has been detected by a communication method varying depending on whether or not it is determined that the device is selected by the user when the searching is in progress, wherein
in a case where it is determined that the device is selected by the user when the searching is in progress, communication is performed with the selected device by an identifier allocated uniquely to the selected device; and
in a case where it is determined that the device is not selected by the user when the searching is in progress, communication is performed with the selected device by an IP address which is allocated to the selected device and is acquired by the detecting of the selected device.

22. The non-transitory computer readable storage medium according to claim 20, wherein the instruction is an instruction to perform a network setting for the device designated by the user in the list.

23. The non-transitory computer readable storage medium according to claim 22, wherein an IP address of the device designated by the user in the list is set by the network setting.

24. The non-transitory computer readable storage medium according to claim 23, wherein a subnet mask or a default gateway of the device designated by the user in the list is further set by the network setting.

25. The non-transitory computer readable storage medium according to claim 22, wherein,
a first instruction for designating a device among one or a plurality of devices being indicated in the list at a point when the first instruction is input is input,
a screen for the network setting is displayed in response to the first instruction, and
the instruction to perform the network setting is input by the user in the displayed screen.

26. The non-transitory computer readable storage medium according to claim 11, wherein in the determining step, it is further determined whether there exists, in the list, another device corresponding to an IP address that is a duplicate of the IP address allocated to the device selected by the instruction, in a case where it is determined that the device is not selected by the user when the searching is in progress,
in a case where it is determined that there exists another device in the list, communication is performed with the selected device by the communication by the identifier, and
in a case where it is determined that there does not exist another device in the list, communication is performed with the selected device by the communication by the IP address.

27. The non-transitory computer readable storage medium according to claim 11, wherein the information processing is connected to a router in the network,
in a case where it is determined in the determining step that the device is not selected by the user when the searching is in progress, and the IP address allocated to the selected device is not included in a range of IP addresses which the router allocates to the one or more devices in the network, communication is performed with the selected device by the communication by the identifier, and
in a case where it is determined in the determining step that the device is not selected by the user when the searching is in progress, and the IP address allocated to the selected device is included in the range of IP addresses which the router allocates to the one or more devices in the network, communication is performed with the selected device by the communication by the IP address.

* * * * *